A. S. RICHEY.
MECHANISM FOR COMPUTING VEHICLE TRAVEL.
APPLICATION FILED AUG. 20, 1919.
1,369,471.
Patented Feb. 22, 1921.
3 SHEETS—SHEET 1.
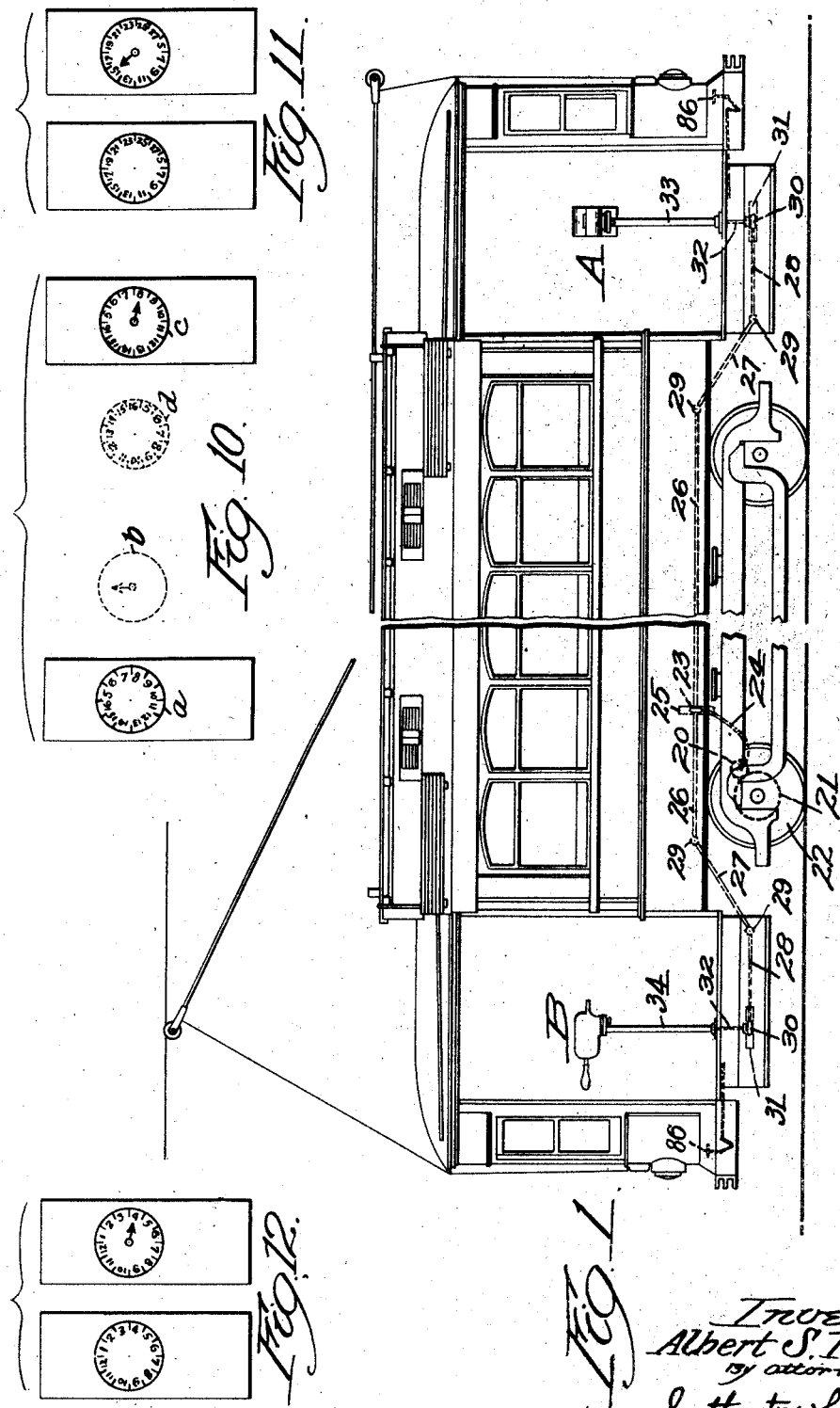
Inventor
Albert S. Richey
by attorneys
Southgate & Southgate

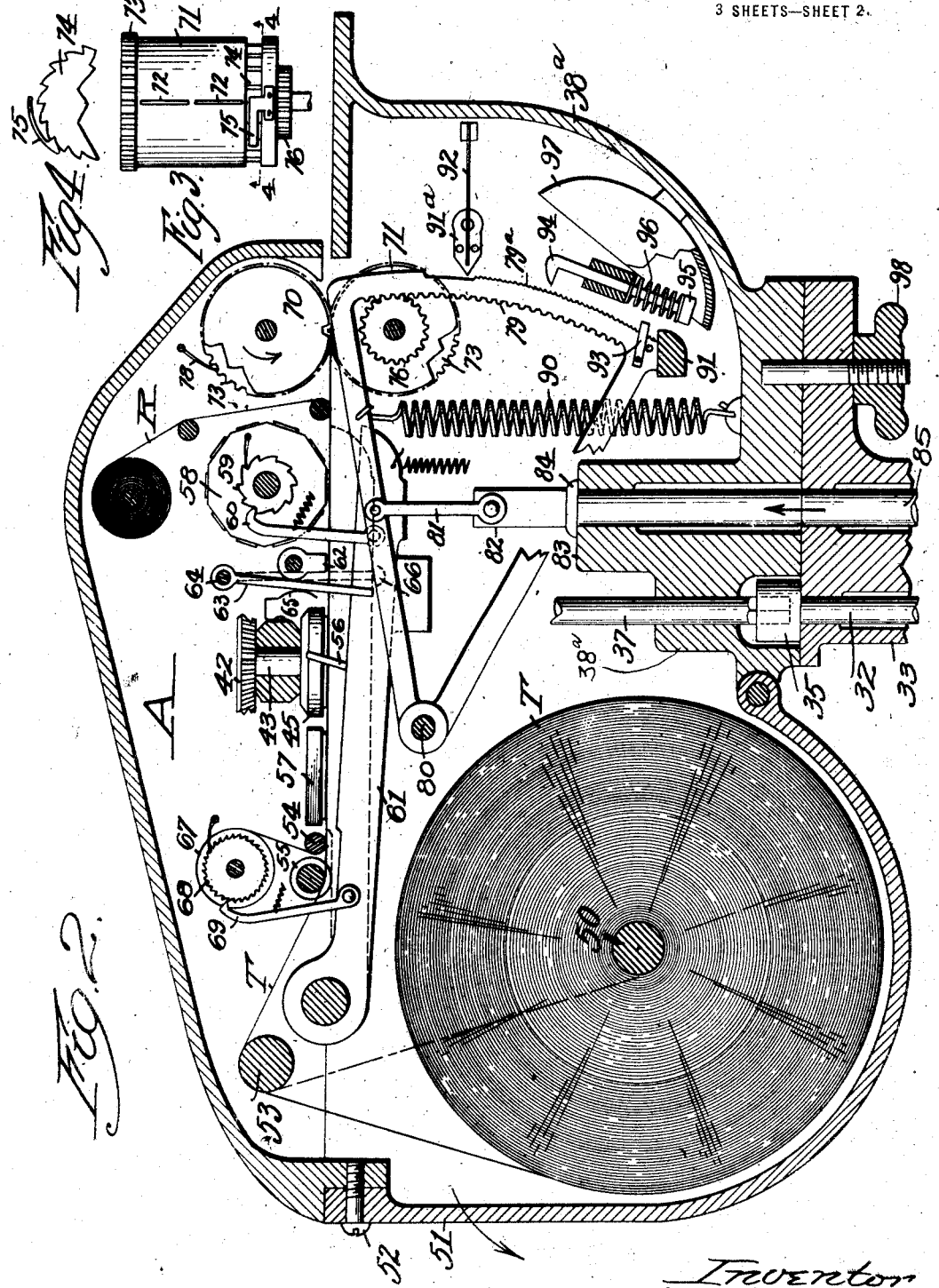

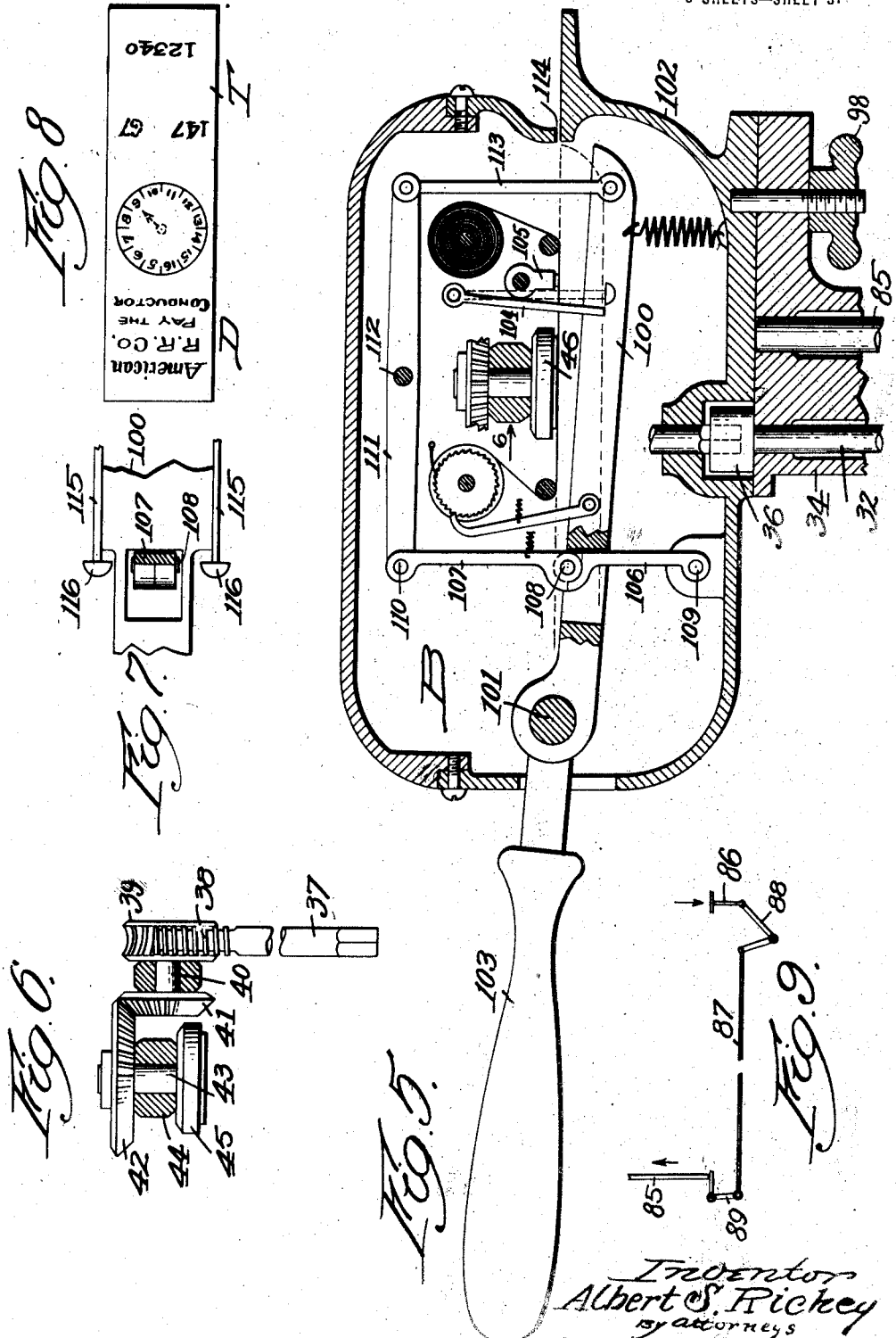

UNITED STATES PATENT OFFICE.

ALBERT S. RICHEY, OF WORCESTER, MASSACHUSETTS.

MECHANISM FOR COMPUTING VEHICLE-TRAVEL.

1,369,471. Specification of Letters Patent. Patented Feb. 22, 1921.

Application filed August 20, 1919. Serial No. 318,663.

*To all whom it may concern:*

Be it known that I, ALBERT S. RICHEY, a citizen of the United States, residing at Worcester, in the county of Worcester and State of Massachusetts, have invented a new and useful Mechanism for Computing Vehicle-Travel, of which the following is a specification.

This invention relates to mechanism for computing vehicle travel, either in units of distance or in units of fare. The mechanism is particularly designed for use on street railroad systems where the fare is based on the actual distance traveled.

This method of computing fares is more equitable than the usual system of using fixed fare limits, but has heretofore involved difficulties in the computation of individual fares which have rendered the system impractical for actual use.

It is the general object of my invention to provide mechanism by which the actual vehicle travel for each passenger may be accurately computed, preferably by a combination of two impressions on tickets issued separately to each passenger as the passenger enters the vehicle.

With this general object in view, important features of my invention relate to the provision of a machine or device for making an initial record for each passenger, and a machine or device for thereafter completing said record to show the actual vehicle travel between the points at which the passenger enters and leaves the vehicle.

Another important feature of my invention consists in the provision of means for driving these two recording machines or devices in definite relation to the travel of the vehicle. Other features relate to the provision of means for issuing a ticket to each passenger as he or she enters the vehicle, means for numbering the tickets serially, means to impress on each ticket marks or numbers indicating the car operators, means to prevent operation of each machine until an individual printing element indicating the corresponding operator is placed in operative position, means to prevent operation of the second machine until the ticket is fully inserted therein, and other devices, arrangements and combinations of parts which will be hereinafter described and more particularly pointed out in the appended claims.

A preferred form of my invention is shown in the drawings, in which—

Figure 1 is a side elevation of a street car, showing the general arrangement of my improved mechanism;

Fig. 2 is a sectional side elevation of the machine for printing and issuing a ticket having an initial or incomplete record thereon;

Fig. 3 is a plan view of one of the ticket feeding and cutting cylinders;

Fig. 4 is a detail sectional view taken along the line 4—4 in Fig. 3 and showing a ratchet feed;

Fig. 5 is a sectional side elevation of the machine for completing the record on the ticket;

Fig. 6 is a detail left-hand elevation of the driving connections of the rotatable dial, looking in the direction of the arrow 6 in Fig. 5;

Fig. 7 is a detail plan view of a portion of the platen, showing the guides and stops for the ticket;

Fig. 8 shows a ticket with a complete record thereon;

Fig. 9 shows the connections by which the machine shown in Fig. 2 may be foot operated, and Figs. 10, 11 and 12 show a number of tickets having both initial and complete records of different distances or fares thereon.

I will first describe the general operation of my improved computing mechanism and will then describe the detailed construction of one form of the mechanism.

In the following description, it will be assumed that the mechanism is in use on a street car operated by the usual motorman and conductor, although it will be obvious that the mechanism may also be used on an automobile, omnibus or on other types of public conveyance.

As a passenger enters the car by the front entrance, the motorman operates a ticket issuing machine A, preferably by a foot pedal, and the machine prints a ticket and issues the same to the passenger. This ticket will have an initial or partial record thereon, preferably comprising a dial showing a series of figures thereon, which may indicate distances, as shown in Fig. 12, or cash fares corresponding to different distances, as shown in Fig. 8.

As the passenger leaves the car, he presents his ticket to the conductor, who inserts the same in a second machine B and prints an index or arrow thereon which indicates on the dial previously printed, the exact distance traveled by the car between the points at which the passenger enters and leaves the car or the fare corresponding to such distance. The passenger then pays the fare thus computed and the transaction is complete. With this system of operation, each passenger pays the fare corresponding exactly to the distance traveled, entirely independent of fixed fare limits or other complications.

In Fig. 8 I have indicated a ticket in which the fare is 5 cents for the first mile, and one cent additional for each succeeding mile; and in Fig. 11, a ticket is shown in which the fare is 5 cents for the first mile and two cents for each additional mile, while in Fig. 12, the ticket indicates the actual distance traveled. Other combinations of fare or distance may be provided on the dials as desired.

The machines A and B are both driven in definite relation to the travel of the car, and any suitable or convenient means of driving the machines in such definite relation may be adopted. A convenient method of driving the machines is by positive connections from a member associated with one of the car wheels.

Such connections are indicated in Fig. 1, in which a pinion 20 is rotated by a gear 21 associated with the car wheel 22 or mounted on the axle thereof. The pinion 20 drives a worm 23 through a flexible shaft 24 and the worm 23 meshes with a worm wheel 25 on a longitudinally extending shaft 26. The shaft 26 is connected through sections 27 and 28 and suitable universal joints 29 to worms 30 engaging worm gears 31 on the lower end of vertical shafts 32. The shafts 32 extend upward through posts or standards 33 and 34 on the front and rear platforms, respectively, and may be provided at their upper ends with sockets 35 and 36 (Figs. 2 and 5).

A shaft 37 is vertically mounted in bearings in the frame 38ª of the ticket issuing machine A, the lower end of the shaft being shaped to fit the socket 35 on the shaft 32. At its upper end the shaft 37 is provided with a worm 38 engaging a worm gear 39 on a short horizontal shaft 40, provided at its opposite end with a bevel pinion 41 which, in turn, meshes with a bevel gear 42. The gear 42 is mounted on a short vertical shaft 43, rotatable in a fixed bearing 44 and supporting a dial or other impression device 45 at its lower end. Similar driving mechanism is provided in the machine B for rotating a printing member 46 preferably having an arrow or index formed thereon.

It will be understood that the mechanism above described for rotating the printing elements 45 and 46 in definite relation to the travel of the vehicle is illustrative only, and that other suitable driving connections may be substituted if desired.

I will now describe the details of the machine A, by which the ticket is printed and delivered to the passenger.

The tickets T may be drawn from a large roll of plain heavy paper, mounted upon a pivot 50 in a cover 51 suitably secured to the machine frame 38. This cover may be opened by removing the screw 52, and the ticket roll may thus be easily replenished. The ticket strip passes over a guide roll 53, and under a second guide roll 54, preferably provided with flanges 55 for centering the ticket under the dial 45. Additional guide pins 56 on each side of the dial 45 may also be provided for guiding the ticket strip. A fixed printing plate 57 may be provided to impress any desired information on the ticket as indicated at D in Fig. 8. A consecutive numbering device 58 may also be provided, having a ratchet wheel 59 engaged by a pawl 60, pivotally mounted on a platen 61, and effective to advance the numbering device one unit at each downward movement of the platen; only the unit wheel is shown in the drawings, as the mechanism for intermittently advancing the other numbering wheels is well known and forms no part of my invention.

Provision is also made for inserting a printing key 62, bearing a number or other device indicating the motorman or car operator. Preferably, a locking arm 63 is pivoted at 64 to the frame 38 and is normally positioned by a spring 65 so that it is above a lug 66 on the side of the platen 61 and prevents the operation thereof. When the key 62 is inserted, it engages the arm 63 and moves it to one side, thus releasing the platen.

An ink ribbon R preferably extends between the several printing devices and the ticket T, the ribbon being suitably guided and being wound upon a spool 67, provided with ratchet teeth 68, engaged by a pawl 69, pivotally mounted on the platen 61, and advancing the ribbon slightly on each downward movement of the platen.

The end of the ticket is received between feed rolls 70 and 71, the roll 71 having cutting plates 72 inserted at one point in the periphery but slightly separated at their inner ends as clearly shown in Fig. 3. The roll 70 is provided with suitable recesses corresponding in position to the knives 72. The rolls 70 and 71 are connected by a pair of gears 73—73 so that they rotate together. The roll 71 is also provided with ratchet teeth 74 (Fig. 4) engaged by a pawl 75, mounted to rotate with a pinion 76. Any suitable locking pawl 78 (Fig. 2) may also be provided to prevent backward movement of the feed rolls.

The pinion 76 is engaged by an internal segment gear 79, pivoted at 80 in the frame 38ª and connected by a link 81 to a plunger 82, slidable in the bearing 83 in the frame 38ª, and having its downward movement limited by a collar 84 on said plunger. An actuating rod 85 is vertically slidable in the post or standard 33 and engages the lower end of the plunger 82. The rod 85 may be moved by the motorman or operator in any convenient manner as by the pedal 86, link 87 and bell cranks 88 and 89 shown in Fig. 9. A spring 90 (Fig. 2) normally holds the segment 79 against the fixed stop 91.

As the plunger 82 is moved upward, the segment 79 moves the pawl 75 idly backward over the ratchet teeth 74. In its continued upward movement, the plunger 82 engages the platen 61 and forces the platen and ticket upward against the ribbon R and against the several printing devices, provided the key 62 is in place to release the platen from the locking arm 63.

When pressure on the plunger 82 is relieved, the spring 90 returns the segment to initial position. During said return movement, the feed rolls 70 and 71 perform a complete revolution, projecting the printed ticket from the machine and nearly severing the same by the knives 72. At the same time, the pawl 60 advances the serial numbering wheels 58 and the pawl 69 operates the ribbon feed.

The segment 79 is provided with a series of external teeth 79ª positioned for engagement by a double acting pawl 91ª held in normal or mid-position by a spring 92. After the movement of the segment in either direction has begun, the pawl 91ª prevents reverse movement until the first movement has been completed, thus insuring a full operative stroke of the plunger 82 and a complete return of all parts to their original positions.

A latch 93 is pivotally mounted on the segment 79 in position to engage a plunger 94 having a head or striker 95, and yieldingly held in mid-position by a spring 96. As the segment 79 moves upward, the plunger 94 is lifted until the angular movement of the parts causes separation thereof, just as the segment approaches its upper limit of travel. The plunger 94 then returns quickly beyond its original position and strikes a quick blow on a bell 97.

The casing 38ª is detachably secured to the post or standard 33 in any convenient manner, as by a wing nut 98, and it will be understood that the machine A may be removed from the standard 33 and placed on the standard 34 when the direction of travel of the car is reversed.

I will now describe the details of the machine B, shown in Fig. 5 and used for completing the record.

A printing element 46 having an arrow or other indication thereon is driven from the socket 36 on the shaft or rod 32, by connections similar to those used in machine A and shown in detail in Fig. 6. A platen 100 is pivoted at 101 in the frame or casing 102 of the machine B and is commonly actuated manually by means of a handle 103. A locking arm 104 is provided, identical in structure and operation with the locking arm 63, and a key 105, preferably bearing the conductor's number, is inserted in machine B to release the platen 100. The keys 62 and 105 may be arranged so that the numbers printed thereby will appear side by side on the ticket, as indicated in Fig. 8. The ribbon mechanism of machine B is also a duplicate of that shown in machine A.

I have provided means for insuring that each ticket shall be fully inserted in machine B before the platen is operated to impress the arrow or index on the previously printed dial.

For this purpose, I provide toggle arms 106 and 107, connected to each other at 108. The arm 106 is pivoted to the frame 102 at 109, and the arm 107 is pivoted at 110 to a lever 111 which in turn is pivoted at 112 to the frame 102. The opposite end of the lever 111 is connected by a link 113 to the end of the platen 100.

When the toggle arms 106 and 107 are in line, the platen is held in its inoperative position as shown in Fig. 5. When the ticket T is inserted in a slot 114 in the casing 102, it is confined between guides 115, Fig. 7, and its inmost position is determined by stops 116. Just before the ticket engages the stops, however, it strikes the toggle arm 107 and moves the arm backward a distance sufficient to break the toggle. The platen may then be operated by the handle 102 to impress an arrow or other indication upon the previously printed dial.

While I have shown the platen 100 as operated by a handle 103, it will be obvious that it may be operated by a plunger as in machine A, if so desired. Otherwise, the plunger 85 in the standard 34 is inoperative when the standard supports machine B, and is used only in connection with machine A.

It will be evident from this description that the impression members 45 in machine A and 46 in machine B rotate in unison and occupy the same angular position in reference to a zero point, at a given point in the travel of the car or vehicle. With this in mind, the operation of the mechanism will be easily understood. As the passenger enters the car, the motorman presses the pedal 86, thus operating machine A to make an impression of the dial 45 upon the ticket, and also printing his own number and the serial number of the ticket. The ticket is then fed outward through a slit in the casing of machine A and is thus delivered to the passenger. The angular position of the dial upon the ticket will correspond to the position of the car upon its route.

When the passenger is about to leave the car, he presents his ticket to the conductor, if the car is operated by two men, and the conductor makes an impression thereon by machine B. The position of the index or arrow upon the previously printed dial will indicate the relative advance or travel of the car since the first impression was made, and will thus indicate the length of ride of the passenger. It will be obvious that this indication may be in any desired units either directly in miles or in fractions thereof, or in units of fares corresponding to the distance traveled.

In Figs. 10, 11 and 12 I have shown records of rides of different distances, taking place in different parts of the route. Figs. 10 and 11 indicating the result in terms of fare and Fig. 12 indicating the distance in miles.

In Fig. 10 I have indicated in full lines at *a* the initial record as it would be produced for a passenger entering the car near the beginning of its route. The position of the index 46 at the same point in the route is indicated in dotted lines at *b*. I have also indicated in full lines at *c* the complete record for a ride of between three and four miles, where the initial fare for the first mile is five cents, with one cent for each additional mile. The fare to be collected is eight cents. The final position of the dial 45 at the time that the record is completed is shown at *d*.

By comparison of the full and dotted figures in each case, it will be seen that the dial and index always occupy the same relative angular position, at the same point in the travel of the car.

In Fig. 11 I have indicated an initial record made after the car has traveled several miles along its route and a final record showing a ride of between five and six miles. In this case the initial fare is 5 cents for the first mile, and two cents for each additional mile, and the record reads directly in terms of cash fare, thus indicating 15 cents for the ride.

In Fig. 12 I have indicated the initial and complete record where the record is made directly in terms of miles, the complete record indicating a ride of between three and four miles.

The records given in Figs. 10 to 12 are illustrative only, and it will be understood that different dials may be provided to indicate the record in any desired units.

Having thus described my invention, it will be seen that I have provided a simple and efficient mechanism by which the actual travel of the car for each passenger may be separately computed by mechanical means, the completed record showing directly the actual travel for each separate passenger, or the fare corresponding thereto.

While I have shown the machines A and B as mounted in separate casings, and as disposed at opposite ends of the car, it will be evident that the machines may be mounted side by side or may be arranged in a single casing where the passengers enter and leave the car from one end only, as in the so-called "one-man" car.

I have shown the machine as driven direct from the wheels, but the broad features of my invention are not to be limited to a particular arrangement of driving mechanism as any convenient mechanical or electrical driving mechanism may be substituted for that shown in the drawings, the only requirement being both impression elements shall be so moved as to indicate the actual travel of the car between impressions.

Obviously, a reversal of the impression devices so that the arrow or index would be printed first and the dial added later would be within the scope of my invention and would produce the same identical results.

Obviously also the ticket feeding, cutting and delivering mechanism may be omitted and the tickets may be inserted by the passenger or operator in machine A as has been described for machine B.

The serial numbering of the tickets furnishes a valuable check upon the conductor, as a complete set of tickets consecutively numbered must be turned in, together with the full amount of fares called for by the separate tickets. The consecutive numbering effectually prevents the conductor from holding out certain tickets, and retaining the fares represented thereby.

Having thus described my invention it will be evident that changes and modifications can be made therein by those skilled in the art within the spirit and scope of my invention as set forth in the claims, and I do not wish to be otherwise limited to the details herein disclosed, but what I claim is:—

1. A mechanism for computing vehicle travel having, in combination, a device for making any number of separate partial records, an additional device for completing each record to show a computed total, and means to drive said two devices in definite relation to the travel of the vehicle.

2. A mechanism for computing vehicle travel having, in combination, means for printing certain parts of an individual travel record for each of a plurality of passengers, means to complete each record to show a computed total in accordance with the distance traveled by a certain passenger, and driving mechanism for said means actuated in definite relation to the travel of the vehicle.

3. A mechanism for computing vehicle travel having, in combination, a machine effective to print and deliver a preliminary record when a passenger enters the vehicle, a second machine effective to complete each record to show a computed total when said passenger is about to leave the vehicle, and means to drive both machines in definite relation to the travel of the vehicle.

4. A mechanism for computing vehicle travel having, in combination, a machine effective to print certain portions of any number of separate records, a second machine effective to print the remaining portion of each record to show a computed total, and means to drive both machines in definite relation to the travel of the vehicle.

5. A mechanism for computing vehicle travel having, in combination, a machine for making certain parts of a record in a position determined by the prior travel of the vehicle, a second machine for completing the record to show a computed total by making additional portions of the record in a position determined by the prior travel of the vehicle to the point where the record is completed, and means to drive said two machines in definite relation to the travel of the vehicle.

6. A mechanism for computing vehicle travel having, in combination, means to print an initial record on a ticket as the passenger begins his travel, means to indicate a number on said record as the passenger finishes his ride, said number representing a computed total having a definite relation to the distance traveled, and driving mechanism for said means actuated in definite relation to the travel of the vehicle.

7. A mechanism for computing vehicle travel having, in combination, a machine for making a preliminary record and having a printing member rotatable in definite relation to the vehicle travel, and a second machine having a member effective to complete said record to show a computed total and also rotatable in definite relation to the vehicle travel.

8. A mechanism for computing vehicle travel having, in combination, a machine for making any number of preliminary records of vehicle travel, a machine for thereafter completing each record to show a computed total and a positive driving connection between a vehicle wheel and said machines.

9. A mechanism for computing vehicle travel having, in combination, a machine for making any number of preliminary records of vehicle travel, a machine for thereafter completing each record to show a computed total, and a geared connection from a vehicle wheel to both of said machines.

10. A mechanism for computing vehicle travel having, in combination, a machine for printing on a ticket a dial definitely positioned in reference to the prior travel of the vehicle, a machine for printing an index sign on said ticket, also definitely positioned in reference to the prior travel of the vehicle at the point where the record is completed, and means to drive both machines in definite relation to the travel of said vehicle.

11. A mechanism for computing vehicle travel having, in combination, means to make any number of records, each by two impressions showing completed vehicle travel between said impressions, and mechanism to drive said means in definite relation to the vehicle travel.

12. A mechanism for computing vehicle travel having, in combination, means to make any number of records, each by two impressions showing completed vehicle travel between said impressions, a device to print a serial number on said record, and mechanism to drive said means in definite relation to the travel of the vehicle.

13. A mechanism for computing vehicle travel having, in combination, means to make any number of records, each by two impressions showing completed vehicle travel between said impressions, devices to indicate the operator on said record, and mechanism to drive said means in definite relation to the travel of the vehicle.

14. A mechanism for computing vehicle travel having, in combination, means effective to print and deliver to an entering passenger a ticket having a preliminary record thereon, and means thereafter to complete said record as said passenger is about to leave the vehicle to indicate the travel between two recording operations, said means being each rendered operative by the insertion therein of a device effective to make an auxiliary impression indicating the operator.

15. A mechanism for computing vehicle travel comprising a machine to print and deliver any number of tickets, each having an initial record thereon, a machine effective to complete each record to show a computed total, and interchangeable driving connections between said two machines and a member rotatable in definite relation to the vehicle travel.

16. A mechanism for computing vehicle travel, comprising a machine to print and deliver any number of tickets, each having an initial record thereon, a locking device normally rendering said machine inoperative, a removable printing element controlling said locking device, and means to thereafter complete each record to show a computed total.

17. In a machine for computing vehicle travel, a ticket printing machine having a manually movable platen, and a toggle to lock said platen in inoperative position, said toggle being positioned to be directly engaged and broken by a fully inserted ticket, and a spring to restore said toggle to locking position when the ticket is withdrawn.

In testimony whereof I have hereunto affixed my signature.

ALBERT S. RICHEY.